United States Patent Office 3,850,891
Patented Nov. 26, 1974

3,850,891
PROCESS FOR THE PREPARATION OF MULTI-
FUNCTIONAL PEROXYDIESTERS
James E. Crawford, Adrian, Mich., assignor to
Owens-Illinois Inc.
No Drawing. Continuation of abandoned application Ser.
No. 177,116, Sept. 1, 1971. This application Jan. 15,
1973, Ser. No. 323,993
Int. Cl. C07c 69/60; C08f 1/60, 27/12
U.S. Cl. 260—78.5 T                    24 Claims

ABSTRACT OF THE DISCLOSURE

Multifunctional peroxydiesters are prepared by reacting a salt of a linear copolymer, having acid functionality, with an acyl halide under oxidizing conditions. The process of this invention can be adapted to permit the *in situ* generation of the peroxydiester in a suspension, solution or emulsion polymerization system. Peroxydiesters prepared in this manner are useful as initiators in the free radical polymerization of ethylenically unsaturated monomers, as well as agents for the cross-linking of linear polymeric chains.

---

This is a continuation of application Ser. No. 177,116, filed Sept. 1, 1971, now abandoned.

BACKGROUND OF THE INVENTION

This invention is directed toward a process for the preparation of multifunctional peroxydiesters, the peroxydiester products of this process, and a method for initiation of free radical polymerization of ethylenically unsaturated monomers.

Olefinic and vinyl monomers are generally recognized to respond to four types of initiators: (a) free radical; (b) cationic; (c) anionic; and (d) coordination. Probably the most common and widely accepted method for the initiation of polymerization of ethylenically unsaturated monomers involves the use of free radicals. Free radical polymerization ordinarily involves the generation of a monomer radical through an interaction of the monomer with an initiator compound, the propagation of the monomer radical chain and the termination of the polymer chain either through the exhaustion of monomer or by disproportionation, Flory, P. J., Journal American Chemical Society, 59:241 (1937). The class of compounds most widely used as initiators in the generation of monomer free radicals in the above type of synthesis are the peroxides.

The peroxides and hydroperoxides of the type which can be employed in the initiation of free radical polymerization of ethylenically unsaturated compounds can be prepared by any one of a number of standard methods, see Kirk and Othmer, "Encyclopedia of Chemical Technology," 2nd Edition, Volume 14, pp. 776–794. Unfortunately, peroxides generated by standard methods of preparation ordinarily yield highly concentrated products which are subject to destabilization upon storage, resulting in the formation of explosive mixtures.

My invention is the discovery of a process for the preparation of multifunctional peroxydiester compounds. Unlike the conventional processes used in the preparation of peroxides, the process of this invention is adaptable to the *in situ* generation of the peroxydiester in a suspension, solution or emulsion polymerization system. A further advantage of these initiator compounds of my invention resides in their ability to impart greater stability to the polymers whose polymerization they initiate. The polymeric segments of these initiator compounds, which become integrated into the polymer chain during the polymerization process, may also affect other physical properties of the polymer, depending upon their concentration relative to the polymer. This invention also includes the polymeric products of this process and the method for the initiation of free radical polymerization of ethylenically unsaturated compounds utilizing the multifunctional peroxydiester as the initiator in these polymerization systems.

SUMMARY OF THE INVENTION

This invention is a process for the preparation of multifunctional peroxydiesters from an acid salt of a linear copolymer and an acyl halide comprising mixing the acid salt of the linear copolymer of the formula

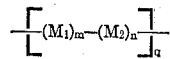

wherein
$M_1$ is

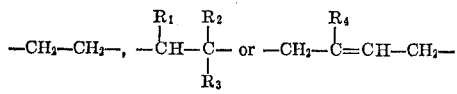

where,
$R_1$ is

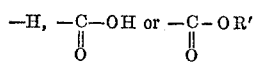

with R' being $CH_3$, $-C_2H_5$,
$R_2$ is

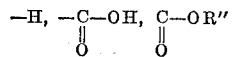

or phenyl
$R_3$ is $-H$, $-CH_3$, $-OR''$ with R'' being alkyl of 1 to 4 carbon atoms,
$R_4$ is $-H$, $-F$, $-Cl$, $-Br$ or $-CH_3$
$M_2$ is

where,
R and $R_6$ are independently selected from

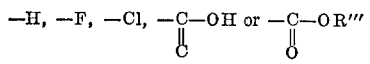

with R''' being $-CH_3$ or $-C_2H_5$
$R_7$ and $R_8$ are independently selected from

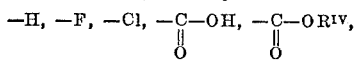

phenyl or

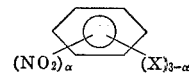

with
$R^{IV}$ being alkyl of 1 to 8 carbon atoms,
X is halogen, and
$\alpha$ is an integer from 0 to 3
$m$ is 1 to 1000
$n$ is 1 to 1000, and
$q$ is 4 to 1000 with in excess of 4 moles per linear copolymer chain to stoichiometric quantities of an acyl halide of the formula

wherein
$R_9$ is alkyl of 1 to 7 carbon atoms, alkenyl of 1 to 4 carbon atoms, aryl or substituted aryl, and
X is halogen in a reaction medium comprising water or mixtures of water and lower alkyl alcohols under oxidizing conditions at temperatures ranging from about −15° C. to that temperature immediately below the thermal decomposition point of the multifunctional peroxydiester for an interval of about 1 to 60 minutes.

In the preferred process of this invention, the reactants are salts of ethylene-acrylic acid copolymers, styrene-maleic anhydride, vinyl ether-maleic anhydride, and acyl halides such as acetylchloride or benzoylchloride. Ordinarily, in those processes in which the reactants do not combine spontaneously at near room temperature, the reaction temperature of the system should preferably be kept about 10 to 15° C. below the thermal decomposition point of the peroxydiester.

Further embodiments of this invention include a method for the initiation of the free radical polymerization of ethylenically unsaturated monomers and the peroxydiester compounds of the following structural formula

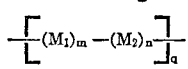

wherein
M₁ is

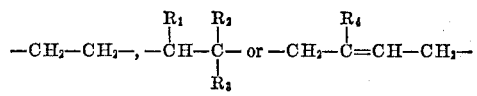

where,
R₁ is

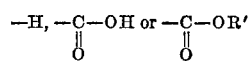

with R' being —CH₃, —C₂H₅,
R₂ is

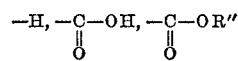

or phenyl
R₃ is —H, —CH₃, —OR" with R" being alkyl of 1 to 4 carbon atoms,
R₄ is —H, —F, —Cl, —Br or —CH₃
M₂ is

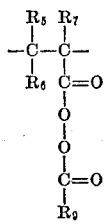

where,
R₅ and R₆ are independently selected from

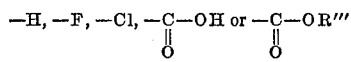

with R'" being —CH₃ or —C₂H₅,
R₇ is

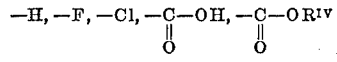

phenyl or

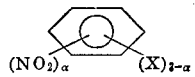

with
R$^{IV}$ being alkyl of 1 to 8 carbon atoms
X is halogen
α is an integer from 0 to 3
R₉ is alkyl of 1 to 7 carbon atoms, alkenyl of 1 to 4 carbon atoms, aryl or halo-substituted aryl,
m is 1 to 1000
n is 1 to 1000, and
q is 4 to 1000

Other peroxydiester materials which can be employed include copolymers of the following structural formulae:

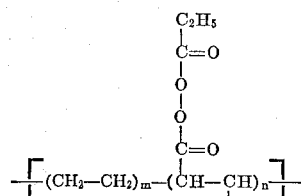

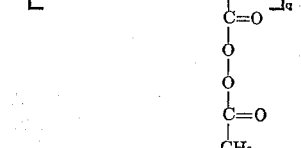

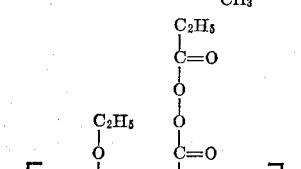

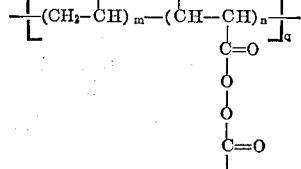

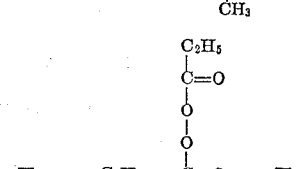

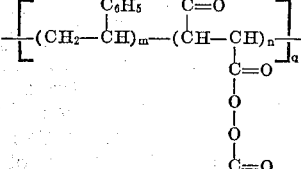

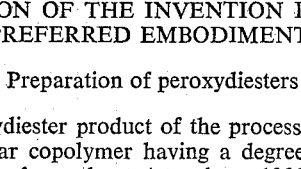

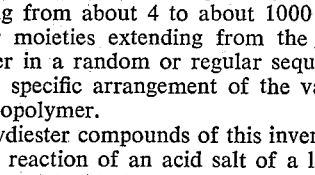

wherein
n is 1
m is 1
q is 4 to 1000

DESCRIPTION OF THE INVENTION INCLUDING PREFERRED EMBODIMENTS

Preparation of peroxydiesters

The peroxydiester product of the process of this invention is a linear copolymer having a degree of polymerization ranging from about 4 to about 1000 and pendant peroxydiester moieties extending from the backbone of the copolymer in a random or regular sequence depending upon the specific arrangement of the various monomers in the copolymer.

The peroxydiester compounds of this invention are prepared by the reaction of an acid salt of a linear copolymer with an acyl halide in an aqueous reaction medium under oxidizing conditions.

Reactants

Copolymer Salt: The copolymer salt reactant of the process of this invention can itself be prepared by reaction of an acid functional copolymer with the free cations in a basic aqueous solution. The conversion of the acid functional group(s) of the copolymer to the corresponding salt can be brought about by first dissolving the copolymer in an aqueous solution containing a base, such as sodium hydroxide. The concentration of the base with respect to the copolymer should be carefully adjusted in order to insure some solubility of the acid functional copolymer. Addition of base in excess of that amount required to establish a solubility equilibrium will result in various undesirable side reactions upon the subsequent addition of the acyl halide. This generation of carboxylate ions from the corresponding carboxylic acid follows well known acid dissociation patterns, Roberts and Caserio, *Basic Principles of Organic Chemistry*, Chapter 16, W. A. Benjamin, Inc., New York (1965).

The acid functional copolymers which dissociate in basic aqueous solutions to form the corresponding salt reactant of this process are themselves prepared by standard polymerization techniques. The various methods used in the preparation of the copolymers of the acid salt reactants of the process of this invention are well known and described in the literature, Sorenson and Campbell, *Preparative Methods of Polymer Chemistry*, Interscience Publishers Inc., New York (1962).

The relative arrangement of the monomeric components in the backbone of the copolymer salt reactants of the process of this invention will, of course, be determined by the relative reactivity ratios of the monomers used in the preparation of the specific copolymer. For example, preparation of copolymers from two monomers whose corresponding free radicals prefer to react exclusively with its opposite number in the polymerization system, will yield a copolymer having a regularly alternating arrangement of monomeric components along its backbone, irrespective of the relative proportions of each monomer in the monomer feed. The free radical polymerization of ethylene with fumaric acid or maleic anhydride is representative of the preparation of alternating copolymer salt reactants of this invention. In sharp contrast, the preparation of copolymers from monomers which do not prefer to react exclusively with the other monomers in the system, will result in copolymers having their monomeric components randomly arranged along their respective backbones. In those instances where the disparity between the relative reactivity ratios of the monomers is great, the resulting copolymer will have a correspondingly disparate ratio of one monomer to the other. The preparation of copolymers from monomers having different reactivity ratios can, to some degree, be controlled by controlling the relative concentration of the monomers in the reaction system. The kinetics of copolymerization of monomers having similar and widely varying reactivity ratios has been studied extensively, and the technical literature is replete with articles fully describing such phenomenon. See F. W. Billmeyer, *Textbook of Polymer Science*, Chapter 11, Interscience Publishers, New York (1966) and accompanying bibliography. Copolymer salts prepared from ethylene-acrylic acid copolymers are illustrative of the random copolymerization of monomers having disparate reactivity ratios.

The acid functional copolymers which can be used in the preparation of the salt reactants of the process of this invention can be represented by the following structural formula

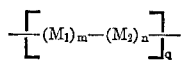

wherein
$M_1$ is

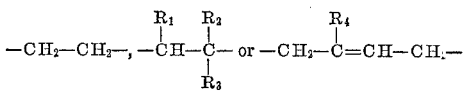

where,
$R_1$ is

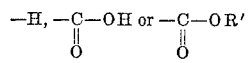

with R' being $-CH_3$, $-C_2H_5$,
$R_2$ is

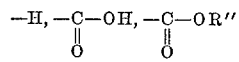

or phenyl
$R_3$ is $-H$, $-CH_3$, $-OR''$
with R'' being alkyl of 1 to 4 carbon atoms,
$R_4$ is $-H$, $-F$, $-Cl$, $-Br$ or $-CH_3$
$M_2$ is

where,
$R_5$ and $R_6$ are independently selected from

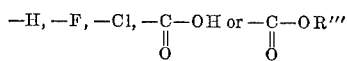

with R''' being $-CH_3$ or $-C_2H_5$
$R_7$ and $R_8$ are independently selected from

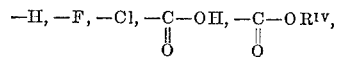

phenyl or

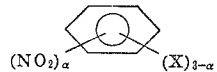

with
$R^{IV}$ being alkyl of 1 to 8 carbon atoms,
X is halogen, and
α is an integer from 0 to 3
$m$ is 1 to 1000
$n$ is 1 to 1000
$q$ is 4 to 1000

Copolymers having the above structural formula which can be used in the preparation of the copolymer salt reactant of the process of this invention are the copolymers of ethylene-acrylic acid, ethylene-maleic anhydride, butadiene-acrylic acid, styrene-acrylic acid, styrene-maleic anhydride and vinyl ether-maleic anhydride.

The preferred salt reactants of the process of this invention are prepared from copolymers of ethylene-acrylic acid, styrene-maleic anhydride and vinyl ether-maleic anhydride.

Acyl Halide: The acyl halide reactant of the process of this invention can be represented by the following structural formula

where,
$R_9$ is alkyl of 1 to 7 carbon atoms, alkenyl of 1 to 4 carbon atoms, aryl or substituted aryl, and
X is halogen Acyl halides of the above formula which can be used in the synthesis of the peroxydiesters of this invention are acetylchloride, propionylchloride, acryloylchloride, butyrylchloride, benzoylchloride and their corresponding isomers and derivatives. Steric hindrance of the copolymer salt tends to indirectly limit both the size of the substituents and the degree of substitution on the acyl halide reactant with which it is to react. Acyl halides that are substituted with lower alkyl radicals (1 to 2 carbon atoms) or with aryl and substituted aryl radicals (where the degree of secondary substitution on the aryl radical is similarly limited), appear to be more sterically compatible in reaction with the various copolymer salts than more extensively substituted carbonyl compounds and are, therefore, preferred in the process of this invention.

Oxidizing agent

The oxidizing agents which can be used in the process of this invention are the peroxides, the hydroperoxides and ozone; with hydrogen peroxide being the preferred agent of this process.

In those instances where ozone is selected as the oxidizing agent of choice, the ozone can be prepared simultaneous with the contacting of the reactants in separate vessels. Once generated, the ozone is bubbled through the reaction medium containing the reactants of this process.

In certain instances, the peroxydiester product of this invention can itself be used as an oxidizing agent for the preparation of additional peroxydiester compounds.

Reaction medium

The reaction medium for the process of this invention can be water or mixtures of water and lower alkyl alcohols (e.g. methyl or ethyl) in any proportion.

In those instances in which the peroxydiester is to be generated in a polymerizing medium (suspension or emulsion systems), the reaction medium may also contain certain other materials indigenous to these systems. For example, suspension polymerization systems routinely contain dispersants to insure suspension of the monomer during polymerization, and, therefore, reaction media of this invention can also be expected to contain such typical dispersants as hydroxyethyl cellulose, hydroxymethyl cellulose, methyl cellulose, polyvinyl acetate, polyvinyl alcohol and gelatin, as well as other standard additives.

Process

The peroxydiesters of this invention can be prepared by the reaction of a linear copolymer salt, of the type previously described, with in excess of 4 moles per copolymer chain to stoichiometric quantities of an acyl halide under oxidizing conditions at temperatures ranging from about $-15°$ C. to temperatures as high as 200° C.

The concentration of acyl halide relative to acid salt of the linear copolymer is based on the degree of peroxydiester functionality requisite to effectively intiate polymerization of ethylenically unsaturated monomers. In most instances, an amount in excess of 4 such functional groups per polymer chain will suffice to achieve the desired initiator activity where customary quantities of such compounds are used to intiate polymerization. The range of concentration of acyl halide relative to the acid salt of the linear copolymer in the process of this invention can, therefore, range from in excess of 4 moles per linear copolymer chain to stoichiometric quantities.

The temperature required to shift the equilibrium of the reaction mass in favor of peroxydiester formation varies directly with the particular combination of reactants in the system. In some instances, the reactants combine so rapidly at room temperatures, that the system must be chilled and maintained at about $-15°$ C. in order to contain and maintain control of such reaction. In sharp contrast, where the copolymer salts are only slightly soluble in their reaction medium, elevated temperatures, often as high as 100° C. are required to shift the equilibrium of the reaction system in favor of peroxy-diester formation. Often at such elevated temperatures, the boiling point of the reaction medium is exceeded, and, therefore, the system must be pressurized to keep the fluid media of the system from evaporating.

With limited exception, the thermal decomposition point of most of the peroxydiester compounds of this invention fall within the temperature range of about 30 to 100° C. In the preferred processes of this invention, the reaction temperature of the system should range from about 10 to 15° C. below the thermal decomposition point of the peroxydiester being prepared.

The order of addition of the reactants to the reaction medium does not appear to be of crical importance nor does it appear necessary to agitate the reaction system in order to cause combination of the reactants. However, some agitation may prove helpful to facilitate such combination and thereby reduce reaction time.

The volume of reaction medium relative to the concentration of the reactants will vary depending upon whether or not the peroxydiester is to be generated in situ in a polymerization system or whether it is to be prepared independent of such system. In the former case, the concentration of the peroxydiester initiator in such a polymerization system will not ordinarily exceed 1% based on the volume of reaction medium in the system. Whereas, the preparation of the peroxydiester independent of such a polymerization will ordinarily involve substantially less reaction medium, especially where the solubility of the copolymer permits the use of less. The volume of reaction medium in this latter instance can often be equivalent to the volume of reactants in the system and will seldom exceed about two fold the volume of such reactants.

In those circumstances where the peroxydiester is to be generated in situ and subsequently initiate free radical polymerization of the ethylenically unsaturated monomer, the copolymer salt can be first generated in the reaction vessel, and then reacted with the acyl halide and oxidizing agent. It may be advisable in certain instances, not to add the other components of the polymerization system to the reaction vessel until after the peroxydiester has been formed, in order to avoid destabilization of the peroxide groups of the peroxydiester. Subsequent to formation of this initiator compound, the various other components of the polymerization system can be freely added without risk of destabilization.

Where the peroxydiester is generated independent of a polymerization system, it can be separated from the reaction medium by starving the system of solvent and thereby precipitating the polymer. In most instances the peroxydiester is separated by evaporation of a reaction medium under a vacuum or by simple filtration techniques.

Formation of the peroxydiester in situ in a polymerization system can proceed in the manner described above with the only minor variant being the composition of the reaction medium. Once the peroxydiester has been formed, the monomer can then be added and the system subsequently heated to a temperature at or above which the peroxydiester decomposes to form free radicals which in turn initiate free radical polymerization of the monomer.

The monomer can also be added to the polymerization system containing a linear copolymer salt and an acyl halide prior to the generation of the peroxydiester. If the synthesis of the peroxydiester is carried out at temperatures at or above the thermal decomposition point of such compound, the peroxydiester will immediately decompose upon formation to form free radicals. These free radicals will then combine, as they are formed, with monomer and form monomer chain radicals.

The rate of polymerization of the monomer within the system will vary directly with the square root of initiator concentration and the temperature of the system. Under normal reaction conditions, the concentration of monomer chain radicals within such a polymerization system will assume a "steady state," such that the rate of their disappearance through termination will equal their rate of formation.

The peroxydiesters of this invention are also sensitive to photochemical destabilization upon exposure to ultraviolet (UV) light. Of course, the specific wavelength which can most efficiently cause decomposition of the peroxydiester to free radicals will shift with the variations in absorption of the specific peroxydiester; each such compound having a greater sensitivity to certain wavelengths of light. The amount of UV energy required to activate, decompose or destabilize the covalent bonds of the peroxide groups in the peroxydiester will also be dependent upon the relative stability of the peroxide functional group. Activation, decomposition or destabilization of the initiator compound of the process of this invention can occur over a broad band of UV wavelengths; however, the interval required for such activation will be most abbreviated at wavelengths of greater absorption.

Both the wavelength of the activating light source and interval required for exposure to such irradiation can be determined by simple experimental techniques, if such data is not so available in the technical literature.

The concentration of initiator free radicals in the polymerization system can also be controlled by the decomposition of the initiator prior to the addition of the monomer. However, an unusually high concentration of initiator radicals within a polymerization system will ordinarily result in formation of polymers having a very low degree of polymerization.

The amount of peroxydiester compound, therefore, needed to effectively initiate free radical polymerization of ethylenically unsaturated monomer will vary with the relative reactivity of the monomer, the temperature of the particular polymerization system and the presence or absence of monomer during decomposition of the initiator compound.

Physical properties and utility

The peroxydiesters of this invention are linear copolymers having a degree of polymerization from about 4 to about 1000. The degree of polymerization and the respective molecular weights of these copolymers can be calculated by vapor pressure osmometry or other standard techniques. The frequency and arrangement of pendant perester functionality will of course vary with the random or alternating arrangement of the monomers in the polymeric chain.

Since the peroxydiesters of this invention readily undergo thermal and photochemical degradation to form free radicals, they are highly effective as a source of initiator compound in the polymerization of olefinic and vinyl monomers in emulsion, solution, suspension and bulk polymerization systems. These peroxydiesters are also highly effective in the initiation of the cross-linking of linear polymer chains and can themselves serve as a link between such adjacent polymeric chains. The peroxydiesters themselves are also useful in the formation of highly branched polymer structures.

The following examples further exemplify the process, composition and method of this invention. Parts and percentages where appearing in such examples are by weight unless otherwise stipulated.

EXAMPLE I

Thirty parts by weight ethylene-acrylic acid copolymer (4:1 ratio) are added to a three neck flask containing 7.2 parts sodium hydroxide in 300 parts water. The contents of the flask are heated at a temperature of 90° C. for 6 hours, cooled to 10° C. and 25 parts of 50% solution of hydrogen peroxide added. A stoichiometric amount of acetyl chloride is then added in incremental amounts such that the temperature of reaction mass does not rise above 15° C. Once the entire quantity of acetyl chloride is added, the reactants in the system are allowed to react with one another for a period of four hours, while holding the temperature constant at 15° C. The reaction product is then separated from the reaction mass by simple filtration techniques, washed with methanol and dried under reduced pressure at room temperatures.

EXAMPLE II

One part of the product of Example I is added to a reactor containing 1600 parts water. The reaction is then purged with nitrogen, sealed and 400 parts of vinyl chloride monomer added. The reactor is heated to 125° F. for a reaction interval of 4½ hours, with agitation of its contents. The resultant polymer is separated from the contents of the reactor by simple filtration techniques, washed with distilled water and air dried.

EXAMPLE III

Following the general procedure of Example I, a multifunctional peroxydiester is prepared from stoichiometric amounts of a sodium salt of vinyl ether-maleic anhydride copolymer and acetylchloride.

EXAMPLE IV

Following the general procedure of Example I, a multifunctional peroxydiester is prepared from stoichiometric amounts of a sodium salt of styrene-maleic anhydride and acetylchloride.

EXAMPLE V

Following the general procedure of Example I, a multifunctional peroxydiester is prepared from stoichiometric amounts of a sodium salt of ethylene-maleic anhydride copolymer and acetylchloride.

EXAMPLE VI

Following the general procedure of Example I, a multifunctional peroxydiester is prepared from stoichiometric amounts of a sodium salt of a styrene-acrylic acid copolymer (4:1 ratio) and acetylchloride.

What is claimed is:

1. A process for the preparation of a linear copolymer having pendant peroxydiester functionality from an acid salt of a linear copolymer and an acyl halide, which comprises: mixing the acid salt of a linear copolymer of the formula $$-\left[(M_1)_m-(M_2)_n\right]_q-$$

wherein
$M_1$ is $$-CH_2-CH_2-, \quad -\underset{\underset{R_3}{|}}{\overset{R_1}{\underset{|}{C}}H}-\overset{R_2}{\underset{|}{C}}-, \quad \text{or} \; -CH_2-\overset{R_4}{\underset{|}{C}}=CH-CH_2-$$

where,
$R_1$ is $$-H, -\underset{O}{\overset{\|}{C}}-OH, \text{ or } -\underset{O}{\overset{\|}{C}}-CR'$$

with R' being $-CH_3$, $-C_2H_5$,
$R_2$ is $$-H, -\underset{O}{\overset{\|}{C}}-OH, -\underset{O}{\overset{\|}{C}}-OR'' \quad \text{or phenyl}$$

$R_3$ is $-H$, $-CH_3$, $-OR''$
with R'' being an alkyl of 1 to 4 carbon atoms,
$R_4$ is $-H$, $-F$, $-Cl$, $-Br$ or $-CH_3$
$M_2$ is $$-\underset{\underset{R_6}{|}}{\overset{\overset{R_5}{|}}{C}}-\underset{\underset{R_8}{|}}{\overset{\overset{R_7}{|}}{C}}-$$

where, $R_5$ and $R_6$ are independently selected from $$-H, -F, -Cl, -\underset{\overset{\|}{O}}{C}-OH \text{ or } -\underset{\overset{\|}{O}}{C}-OR'''$$

with $R'''$ being $-CH_3$ or $-C_2H_5$ $R_7$ and $R_8$ are independently selected from $$-H, -F, -Cl, -\underset{\overset{\|}{O}}{C}-OH, -\underset{\overset{\|}{O}}{C}-OR^{IV}, \text{ phenyl or}$$

[benzene ring with $(NO_2)_\alpha$ and $(X)_{3-\alpha}$ substituents]

with $R^{IV}$ being an alkyl of 1 to 8 carbon atoms, and

X is a halogen $\alpha$ is 0 to 3

$m$ is 1 to 1000

$n$ is 1 to 1000

$q$ is 4 to 1000, with an acyl halide of the formula $$R_9-\underset{\overset{\|}{O}}{C}-X$$

wherein $R_9$ is an alkyl of 1 to 7 carbon atoms, alkenyl of 1 to 4 carbon atoms, aryl or substituted aryl, and X is a halogen in a reaction medium, comprising water or mixtures of water and lower alkyl alcohols and in the presence of hydrogen peroxide or ozone at temperatures ranging from about $-15°$ C. to $200°$ C. so as to form said linear copolymer having pendant peroxydiester functionality.

2. The process as defined in Claim 1, wherein the linear copolymer salt is derived from an ethylene-acrylic acid copolymer.

3. The process as defined in Claim 1, wherein the linear copolymer salt is derived from an ethylene-maleic anhydride copolymer.

4. The process as defined in Claim 1, wherein the linear copolymer salt is derived from a styrene-acrylic acid copolymer.

5. The process as defined in Claim 1, wherein the linear copolymer salt is derived from a styrene-maleic anhydride copolymer.

6. The process as defined in Claim 1, wherein the linear copolymer salt is derived from a vinyl ether-maleic anhydride copolymer.

7. The process as defined in Claim 1, wherein the acyl halide is acetylchloride.

8. The process as defined in Claim 1, wherein the acyl halide is benzoylchloride.

9. The process as defined in Claim 1, wherein hydrogen peroxide is employed.

10. The process as defined in Claim 1, wherein the mixture of acid salt of a linear copolymer and acyl halide are heated to a temperature about $15°$ C. below the thermal decomposition point of the multifunctional peroxydiester.

11. A method for the initiation of free radical polymerization of ethylenically unsaturated monomers with a peroxydiester, comprising:

(a) contacting an ethylenically unsaturated monomer in an aqueous medium with a polymerization initiating effective amount of a linear copolymer having pendant peroxydiester functionality produced in accordance with the process of Claim 1 wherein $R_9$ is alkyl of 1 to 7 carbon atoms, or alkenyl of 1 to 4 carbon atoms, and (b) generating free radicals by destabilization of peroxide groups of said linear copolymer.

12. The method for the initiation of free radical polymerization as defined in Claim 11, wherein the free radicals are generated by thermal destabilization of the peroxide groups of the peroxydiester by heating at temperatures sufficient to cause cleavage of peroxide bonds.

13. The method for the initiation of free radical polymerization as defined in Claim 11, wherein the free radicals are generated by photochemical destabilization of the peroxide groups of the peroxydiester by exposure to ultraviolet light for an interval sufficient to cause cleavage of the peroxide bonds.

14. The method as defined in Claim 11 wherein the linear copolymer is the product of the reaction of a stoichiometric amount of a linear copolymer salt of ethylene-acrylic acid and a stoichiometric amount of acetylchloride.

15. The method as defined in Claim 11, wherein the linear copolymer is the product of the reaction of a stoichiometric amount of a salt or an ethylene-maleic anhydride copolymer and a stoichiometric amount of acetylchloride.

16. The method as defined in Claim 11, wherein the linear copolymer is the product of the reaction of a stoichiometric amount of a salt of a styrene acrylic acid copolymer and a stoichiometric amount of acetylchloride.

17. The method as defined in Claim 11, wherein the linear copolymer is the product of the reaction of a stoichiometric amount of a salt of a styrene-maleic anhydride copolymer and a stoichiometric amount of acetylchloride.

18. The method as defined in Claim 11, wherein the linear copolymer is the product of the reaction of a stoichiometric amount of a salt of a vinyl ether-maleic anhydride copolymer and a stoichiometric amount of acetylchloride.

19. As a composition of matter a linear copolymer having peroxydiester functionality said composition being the reaction product of Claim 1 wherein $R_9$ is an alkyl of 1 to 7 carbon atoms, or an alkenyl of 1 to 4 carbon atoms.

20. The composition of Claim 19 wherein said acid salt of a linear copolymer is an acid salt of a linear copolymer of acrylic acid with ethylene or styrene.

21. As a composition of matter the composition of Claim 19 wherein said acid salt of a linear copolymer is an acid salt of a linear copolymer of maleic anhydride and methyl vinyl ether or ethylene or styrene.

22. A method for the preparation of a linear copolymer having peroxydiester functionality capable of initiating free radical polymerization which comprises reacting in an aqueous system an acid salt of a linear copolymer having pendant acid functionality with an acyl halide of the formula $$R_9-\underset{\overset{\|}{O}}{C}-X$$

wherein $R_9$ is an alkyl of 1 to 7 carbon atoms, an alkenyl of 1 to 4 carbon atoms, or an aryl or substituted aryl, X is halogen, and wherein said reacting is done in the presence of ozone or hydrogen peroxide at a temperature and for a time sufficient to form said linear copolymer having peroxydiester functionality.

23. As a composition of matter the reaction product of Claim 22 wherein $R_9$ is an alkyl of 1 to 7 carbon atoms.

24. In a method for the initiation of free-radical polymerization of ethylenically unsaturated compounds wherein a free-radical polymerizable ethylenically unsaturated monomer is polymerized in the presence of a peroxy free-radical initiator, the improvement wherein said peroxy free-radical initiator is a linear copolymer having peroxydiester functionality produced in accordance with the method of Claim 22 wherein $R_9$ is an alkyl of 1 to 7 carbon atoms.

References Cited

UNITED STATES PATENTS

| | | | |
|---|---|---|---|
| 3,536,676 | 10/1970 | Mageli et al. | 260—78.5 |
| 3,592,948 | 7/1971 | Bafford et al. | 260—453 |
| 3,287,338 | 11/1966 | Guillet | 260—89.1 |
| 3,397,245 | 8/1968 | Appell | 260—610 |

FOREIGN PATENTS 1,041,088   9/1966   Great Britain.

OTHER REFERENCES

Journal of Polymer Science: Part A, vol. 2, pp. 2417–2422 (1964), Decomposition of Asymmetric Peranhydrides, Smets et al.

Synthesis of Peroxide Esters of Aliphatic Dibasic Acids: Yurzhenko et al.: Journal of Organic Chem. of the U.S.S.R., vol. 1, January–April 1964), pp. 689–91.

Graft Copolymerization With Peranhydride Side Groups; Rillaer et al.; Journal of Polymer Science: Part A, vol. 2, pp. 2423–2436 (1964).

Graft Copolymerization With Perester Side Groups; Smets et al.; Journal of Polymer Science: vol. 54, pp. 65–81 (1961).

JOSEPH L. SCHOFER, Primary Examiner

J. KIGHT, Assistant Examiner

U.S. Cl. X.R.

204—159.23; 260—Dig. 28, 80 P, 82.1, 88.1 PC, 95 R, 96 R, 453 R, 610 D

UNITED STATES PATENT OFFICE
CERTIFICATE OF CORRECTION

Patent No. 3,850,891          Dated November 26, 1974

Inventor(s) James E. Crawford

It is certified that error appears in the above-identified patent and that said Letters Patent are hereby corrected as shown below:

Column 2, about line 29, after OH, insert a hyphen --(-)--.

Column 2, about line 42, insert --($_5$)-- after R, first occurrence.

Column 2, about line 44, the formula " $-\underset{\|}{C}-OH$ ", first occurrence, should be -- $-\underset{\|}{\overset{C}{C}}-OH$ -- .

$\phantom{xxxxxxxxxxxxxxxxxxxxxxxxxxxxxx}O$

Column 6, about line 2, insert -- $_2$ -- after CH, last occurrence.

Column 9, line 63, "apperaing" should be -- appearing --.

Column 10, about line 63, claim 1, in the formula " $-\underset{\|}{C}-CR'$ " should be -- $-\underset{\|}{C}-OR'$ --.

$\phantom{xx}O \phantom{xxxxxxxxxxxxxxxxxxxx} O$

Signed and sealed this 24th day of June 1975.

(SEAL)
Attest:

RUTH C. MASON          C. MARSHALL DANN
Attesting Officer       Commissioner of Patents
                              and Trademarks